Aug. 6, 1929.   G. ROSENQVIST   1,723,659
METHOD OF FORMING HOLLOW ARTICLES
Filed Nov. 16, 1926
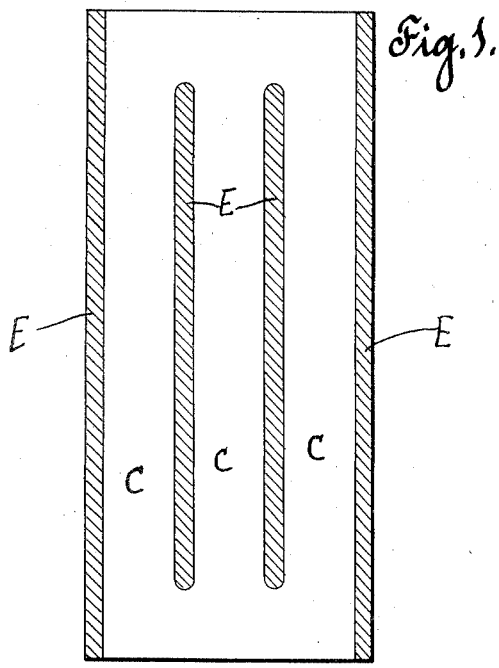
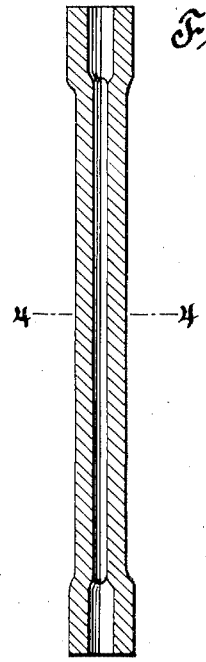
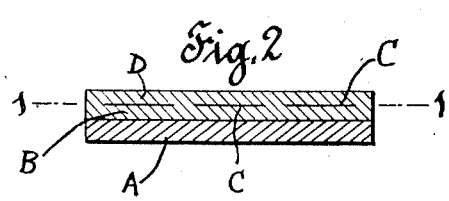
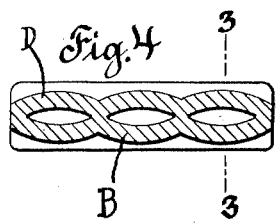
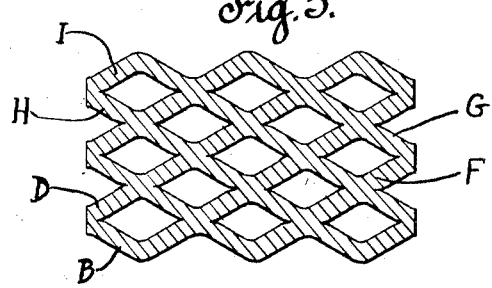
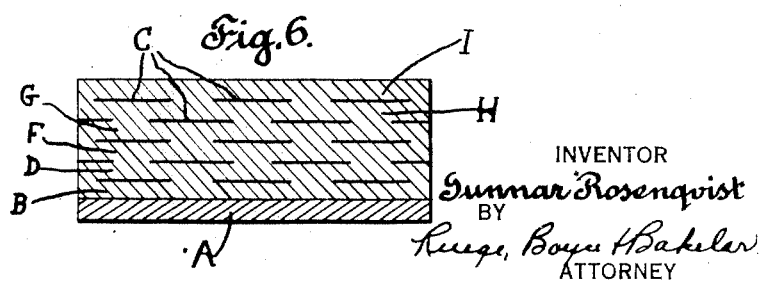
INVENTOR
Gunnar Rosenqvist
BY
Ruege, Boyu H Bakelar
ATTORNEY Patented Aug. 6, 1929.

1,723,659

UNITED STATES PATENT OFFICE.

GUNNAR ROSENQVIST, OF PITTSBURGH, PENNSYLVANIA.

METHOD OF FORMING HOLLOW ARTICLES.

Application filed November 16, 1926. Serial No. 148,627.

This invention relates to a method of forming hollow articles, the object of the invention being to provide a method by means of which such articles as tubing, radiators, etc. can be formed by galvanoplastic precipitation of the metal from which the article is to be made.

With the foregoing and other objects in view, which will appear as the description proceeds, the invention consists in the novel method which will be more fully described hereinafter and particularly pointed out in the claims.

In the drawings accompanying and forming part of this specification.

Fig. 1 is a horizontal sectional view taken on the line 1—1 of Fig. 2 and illustrating my improved method as applied to the formation of a single series of tubes forming an integral structure;

Fig. 2 is a transverse sectional view of the structure shown in Fig. 1;

Fig. 3 is a longitudinal section taken on the line 3—3 of Fig. 4 illustrating one of the tubes after it has been opened out;

Fig. 4 is a transverse section taken on the line 4—4 of Fig. 3;

Fig. 5 is a transverse sectional view similar to Fig. 4, but illustrating the invention applied to the formation of a plurality of series of tubes forming an integral whole; and Fig. 6 is a transverse sectional view illustrating the manner of depositing the layers of material to form the article shown in Fig. 5.

The same characters of reference designate the same parts in the different figures of the drawings.

The improved method consists in superimposing by galvanoplastic precipitation a plurality of layers of the metal from which the article is to be formed, said layers adhering together only at desired points or surfaces, or along certain definite lines, the layers being later separated one from the other by mechanical means at those portions of the surfaces which have not adhered together.

Referring to the drawings, the method may be carried out by depositing on a matrix A by galvanoplastic precipitation a layer B of metal of any desired thickness. Certain portions of the exposed upper surface of this layer are then covered with a coating of some material which will prevent adhesion of opposed portions of a superimposed layer. A second layer D of metal is then deposited over the entire surface of B, whereupon the layers B and D will unite and become an integral structure only along those portions not covered by the coating. As illustrated in Figs. 1 and 2, the coating is applied at C, so that the layers B and D unite only along the portions indicated by E. By the use of mechanical means, such as special tools, air or water pressure, the layers B and D may then be separated from each other between the united portions E thereof thus forming a hollow body comprising a single series of tubular elements as indicated in Figs. 3 and 4. If preferred, the entire surface of the layer B may be coated with the material C and the latter removed at the portions where it is desired that the layers B and D shall unite.

Figs. 5 and 6 illustrate the application of the method to the formation of a somewhat more complicated structure. In this case, a plurality of layers of metal B, D, F, G, H and I are deposited in superimposed relation, each being separated from contiguous layers at portions of their surfaces by coatings C, as shown in Fig. 6, and upon forcing the layers apart at these portions in the manner hereinbefore described a structure comprising a plurality of series of tubular members such as shown in Fig. 5 may be formed.

While I have illustrated herein the use of a matrix, it will be readily understood that after the deposition of the first layer of metal this layer may have the coating C applied at both sides thereof and the remaining layers deposited thereon also at both sides.

Having thus described my invention, what I claim is:

1. The method of forming hollow articles which consists in depositing a layer of metal, covering said layer at predetermined portions of its surface with a separating coating, depositing a second layer of metal on the partly coated surface, and forcing the layers apart at the coated portions.

2. The method of forming hollow articles which consists in depositing a layer of metal by galvanoplastic precipitation, covering said layer at predetermined portions of its surface with a separating coating, depositing a second layer of metal on the partly coated surface, and forcing the layers apart at the coated portions, said layers being united at the uncoated portions and each forming one half of the wall of an integral tubular article.

3. The method of forming hollow articles which consists in depositing by galvanoplastic precipitation a plurality of successive layers of metal disposed in contiguous relation, the exposed surface of each successive layer being covered at predetermined portions thereof with a separating coating before the deposition of the next succeeding layer, and forcing the layers apart at the coated portions, said layers being united at the uncoated portions and each forming one half of the wall of an integral tubular article.

In testimony whereof I have signed my name to this specification.

GUNNAR ROSENQVIST.